(12) United States Patent
Zhang et al.

(10) Patent No.: US 11,430,626 B2
(45) Date of Patent: Aug. 30, 2022

(54) HIGH-RESOLUTION DISPLAY PLASMA MODULE AND MANUFACTURING METHOD THEREOF

(71) Applicant: WUXI VISION PEAK TECHNOLOGY CO., LTD, Wuxi (CN)

(72) Inventors: Lei Zhang, Wuxi (CN); Shan Chen, Wuxi (CN); Jin Bao, Wuxi (CN)

(73) Assignee: WUXI VISION PEAK TECHNOLOGY CO., LTD, Wuxi (CN)

( * ) Notice: Subject to any disclaimer, the term of this patent is extended or adjusted under 35 U.S.C. 154(b) by 591 days.

(21) Appl. No.: 16/335,271

(22) PCT Filed: Mar. 7, 2018

(86) PCT No.: PCT/CN2018/078220
§ 371 (c)(1),
(2) Date: Mar. 21, 2019

(87) PCT Pub. No.: WO2019/140758
PCT Pub. Date: Jul. 25, 2019

(65) Prior Publication Data
US 2021/0327672 A1    Oct. 21, 2021

(30) Foreign Application Priority Data

Jan. 19, 2018  (CN) .......................... 201810054139.2
Mar. 1, 2018   (CN) .......................... 201810171462.8
Mar. 1, 2018   (CN) .......................... 201810171783.8

(51) Int. Cl.
*H01J 11/22*      (2012.01)
*G02F 1/16756*    (2019.01)
(Continued)

(52) U.S. Cl.
CPC ............ *H01J 11/22* (2013.01); *G02F 1/1339* (2013.01); *G02F 1/167* (2013.01); *G02F 1/1676* (2019.01);
(Continued)

(58) Field of Classification Search
CPC .... H01J 11/22; G02F 1/16756; G02F 1/1676; G02F 1/16766; G02F 1/1681; G02F 1/1339; G02F 1/167; G02F 11/36
See application file for complete search history.

(56) References Cited

U.S. PATENT DOCUMENTS 4,093,534 A    6/1978  Carter et al.
6,392,786 B1   5/2002  Albert
(Continued)

FOREIGN PATENT DOCUMENTS

CN    104216193 A    12/2014
CN    107357109 A    11/2017
(Continued)

*Primary Examiner* — Anne M Hines
(74) *Attorney, Agent, or Firm* — Bayramoglu Law Offices LLC

(57) ABSTRACT

The present invention belongs to the field of electronic display technology, and relates to a high-resolution display plasma module and a manufacturing method thereof. The high-resolution display plasma module includes a pixel electrode and a transparent electrode. A display plasma is provided between the pixel electrode and the transparent electrode, and a spacer frame is provided around the display plasma. A plasma barrier enclosure array is provided on the pixel electrode. The plasma barrier enclosure array includes a plurality of plasma barrier enclosures arranged in an array. The pixel electrode includes a plurality of pixel electrode units arranged in an array. The plasma barrier enclosure is
(Continued)

located on the gap between the pixel electrode units. Each plasma barrier enclosure contains only one pixel electrode unit.

6 Claims, 1 Drawing Sheet

(51) Int. Cl.
  *G02F 1/1676* (2019.01)
  *G02F 1/1339* (2006.01)
  *G02F 1/167* (2019.01)
  *H01J 11/36* (2012.01)
  *G02F 1/16766* (2019.01)
  *G02F 1/1681* (2019.01)
(52) U.S. Cl.
  CPC ........ *G02F 1/1681* (2019.01); *G02F 1/16756* (2019.01); *G02F 1/16766* (2019.01); *H01J 11/36* (2013.01); *G02F 2201/50* (2013.01)

(56) References Cited

U.S. PATENT DOCUMENTS

| | | |
|---|---|---|
| 2009/0180172 A1 | 7/2009 | Murakami |
| 2009/0225064 A1 | 9/2009 | Sah |
| 2011/0175856 A1 | 7/2011 | Hong |
| 2017/0068145 A1 | 3/2017 | Nakamura et al. |
| 2017/0082904 A1* | 3/2017 | Miyata ................ G02F 1/16756 |

FOREIGN PATENT DOCUMENTS

| | | |
|---|---|---|
| EP | 2221661 A2 | 8/2010 |
| JP | 2005043810 A | 2/2005 |
| JP | 2013044904 A | 3/2013 |
| KR | 20160126788 A | 11/2016 |
| WO | 2007116732 A1 | 10/2007 |

\* cited by examiner

HIGH-RESOLUTION DISPLAY PLASMA MODULE AND MANUFACTURING METHOD THEREOF

CROSS REFERENCE TO THE RELATED APPLICATIONS

This application is the national phase entry of International Application No. PCT/CN2018/078220, filed on Mar. 7, 2018, which is based upon and claims priority to Chinese Patent Application No. 201810171783.8, filed on Mar. 1, 2018, Chinese Patent Application No. 201810171462.8, filed on Mar. 1, 2018, and Chinese Patent Application No. 201810054139.2, filed on Jan. 19, 2018, the entire contents of which are incorporated herein by reference.

TECHNICAL FIELD

The present invention relates to a display plasma module and a manufacturing method thereof, in particular to a high-resolution plasma display module and a manufacturing method thereof, which belong to the field of electronic display technology.

BACKGROUND

The electrophoresis display uses the phoresis phenomenon of the charged colloidal particles under the action of an electric field to display the images and words by driving the electrophoretic particles with different photoelectric properties by the electric field. Compared with the display technique in the prior art, the electrophoretic display has the following characteristics: flexible and easy to bend, light, thin, high contrast, low energy consumption, large visual angle, readable under sunlight, image bistable state, and easy mass production etc.

Electrophoretic display technique was first proposed in the 1970s. The U.S. Pat. No. 3,892,568 discloses a process of preparing an electrophoretic display material containing at least one type of electrophoretic particles. The patent NO. JP1086116 discloses an electrophoretic display system containing at least one type of electrophoretic particles and the electrophoretic liquid is encapsulated with microcapsules. The U.S. Pat. No. 6,930,818 discloses an electrophoretic display unit with the electrophoretic liquid encapsulated by a micro-cup structure. The U.S. Pat. Nos. 5,930,026, 5,961,804, 6,017,584, and 6,120,588 disclose a microencapsulated electrophoretic display unit, wherein the display plasma includes two or more types of electrophoretic particles having different photoelectric properties. Taking a panoramic view of the prior art, the micro-cup electronic ink display screen and the microcapsule electronic ink display screen are both based on tiny cavity structures, namely, micro-cups and microcapsules. These two types of microstructures play a role of dispersedly encapsulating the display plasma.

Although the display screens with these two kinds of structures have been used in actual products, they have the following deficiencies.

1) The microcapsules and the micro-cups themselves have no display function, and are mainly made of transparent materials having a poor covering power. Moreover, a large amount of these materials are used in the entire electrophoretic display system, which lowers the covering power of the entire display screen, the contrast, the resolution, and the service life.

2) There is no doubt that the use of the microcapsules and micro-cup structures will increase the thickness of the entire electrophoretic display material layer, thereby causing lowered contrast and resolution of the display screen, slower response speed, increased driving voltage, slower refresh speed, increased power consumption, and narrowed operating temperature range.

3) The processes of preparing the microcapsules and micro-cups are too complicated, which raises difficulty and waste in manufacturing, reduced yield, material waste, and high manufacturing cost.

SUMMARY

The objective of the present invention is to provide a high-resolution display plasma module and a manufacturing method thereof to solve the problems of the electronic display screen in the prior art, in which the existing micro-cup structure or microcapsule can be directly replaced with the display plasma. A plasma barrier enclosure array is provided in a gap between the pixel electrode units on the pixel electrode. The plasma barrier enclosure array with a patterned structure surrounds each pixel electrode unit, thereby achieving a high-resolution display effect. The plasma display module of the present invention can achieve a high-resolution, multi-color, multi-grayscale display effect.

In order to achieve the above-mentioned technical objective, the technical solution of the present invention is as follows. A high-resolution display plasma module, includes a pixel electrode and a transparent electrode located above the pixel electrode, characterized in that a display plasma is provided between the pixel electrode and the transparent electrode, and a spacer frame is located around the display plasma; a plasma barrier enclosure array for uniformly dispersing and stabilizing the display plasma is provided on the pixel electrode; the plasma barrier enclosure array includes a plurality of plasma barrier enclosures distributed in an array; the pixel electrode includes a plurality of pixel electrode units distributed in an array; the plasma barrier enclosure is located in a gap between the pixel electrode units, and each plasma barrier enclosure contains only one pixel electrode unit.

Further, a width of the plasma barrier enclosure is equal to a width of the gap between the pixel electrode units; the width of the plasma barrier enclosure is not more than 30 microns; and a height of the plasma barrier enclosure is not more than 60 microns.

Further, a material of the plasma barrier enclosure in the plasma barrier enclosure array is acrylic resin, polyurethane resin, epoxy resin, organic silicone resin, or glass.

Further, the pixel electrode is internally embedded in a Thin Film Transistor (TFT) glass substrate, and the pixel electrode and the display plasma are adhered to each other by a lightproof insulating adhesive layer.

Further, an electrically conductive layer is provided between the display plasma and the transparent electrode, and an electrically conductive layer is also provided between the spacer frame and the transparent electrode; a display area protection layer is provided between the spacer frame and the electrically conductive layer, and a display area protection layer is also provided between an edge of the display plasma and the electrically conductive layer.

Further, the display plasma has a thickness of 2-70 microns; an electrophoretic fluid in the display plasma has a viscosity of 100-100000 cP; and the display plasma includes at least two kinds of electrophoretic particles having different photoelectric properties.

Further, the spacer frame and the display plasma may include supporting microspheres; a material of the supporting microspheres includes resin microspheres and glass microspheres; and each supporting microsphere has a diameter of 2-60 microns.

In order to achieve the above-mentioned technical objective, the present invention also provides a method for manufacturing a high-resolution display plasma module, characterized in that the method includes the following steps:

step 1: pre-preparing a plasma barrier enclosure array on a pixel electrode;

step 2: embedding the pixel electrode into a TFT glass substrate, and placing the TFT glass substrate on an adhesive dispensing platform;

step 3: dispensing a frame sealing adhesive on the pixel electrode to form a spacer frame;

step 4: silk-screen printing a display plasma in the spacer frame;

step 5: coating an electrically conductive silver paste in the spacer frame;

step 6: laminating an electrically conductive layer, a transparent electrode and a display area protection layer on the entire spacer frame, and performing a curing;

step 7: trimming off a part of the transparent electrode, the electrically conductive layer, and the display area protection layer to expose a predetermined position for binding an integrated circuit (IC) module on the pixel electrode;

step 8: attaching the IC module and a flexible circuit board to an edge of the pixel electrode by an electrically conductive adhesive tape;

step 9: fixing and sealing edges of the IC module, the flexible circuit board, and the electrically conductive adhesive tape on the pixel electrode by a Room Temperature Vulcanized (RTV) silicone to complete a manufacture of the electronic ink display screen.

Further, in the step 1, a lightproof insulating adhesive layer may be pre-coated on a surface of the pixel electrode, and supporting microspheres may be pre-coated on the insulating adhesive layer.

Further, in the step 1, the plasma barrier enclosure array is covered on a surface of the pixel electrode by printing, coating or adhesive dispensing, and then curing by photo curing, heat curing or moisture curing, or the plasma barrier enclosure array may be configured by a physical property method or a chemical property method.

Compared with the traditional electronic ink display screen, the present invention has the following advantages:

1) Compared with the traditional microstructure electrophoretic display screen, without involving the traditional micro-capsule or micro-cup in the display, the display effects will be affected. In the present invention, the micro-capsule or the micro-cup is replaced with the display plasma, so the display effects are better and the contrast is increased by more than 10%.

2) The display plasma of the present invention can reduce the thickness of the entire electrophoretic display layer, reduce the response time to less than 80 milliseconds, reduce the driving voltage to +1.5 V to +8V and −8V to −1.5V, and broaden the operating temperature range to −30-70° C. Meanwhile, the production cost is reduced.

3) In the present invention, a patterned plasma barrier enclosure array is provided in the gap between the pixel electrode units, which can effectively and uniformly disperse and stabilize the display plasma, and improve the display effects.

4) A plasma barrier enclosure is configured around a single pixel electrode unit to form a patterned structure of the enclosure. The plasma barrier enclosure is covered on the gap between the pixel electrode units, and each pixel electrode unit is surrounded by the plasma barrier enclosure. Compared with the traditional microstructure electrophoretic display screen, the the black-and-white display resolution of the present invention can reach more than 600 dpi, the full-color display resolution can reach more than 200 dpi, and a display of 4, 8, 16, 32, 64, and even higher grayscale can be achieved.

5) The pixel electrode unit is controlled by the source circuit and the gate circuit. The structure of the plasma barrier enclosure can effectively prevent the short circuit between the adjacent pixel electrode units. Meanwhile, the interference between the electric fields generated by the pixel electrode units is avoided, and the display plasma particles are prevented from gathering on the source circuit and the gate circuit, thereby ensuring the directivity and verticality of the electric field between the pixel electrode and the transparent electrode.

6) The display area protection layer of the present invention protects the display plasma of the display area, and plays a role of lightproof and insulation.

7) The lightproof layer and the insulating adhesive layer of the present invention are used to protect the pixel electrode from optical radiation, isolate the display plasma and the pixel electrode, and prevent the display plasma from damaging the pixel electrode.

8) The manufacturing process of the present invention can be used to manufacture a large-scale display plasma module more than 100 inches.

Figure 1:
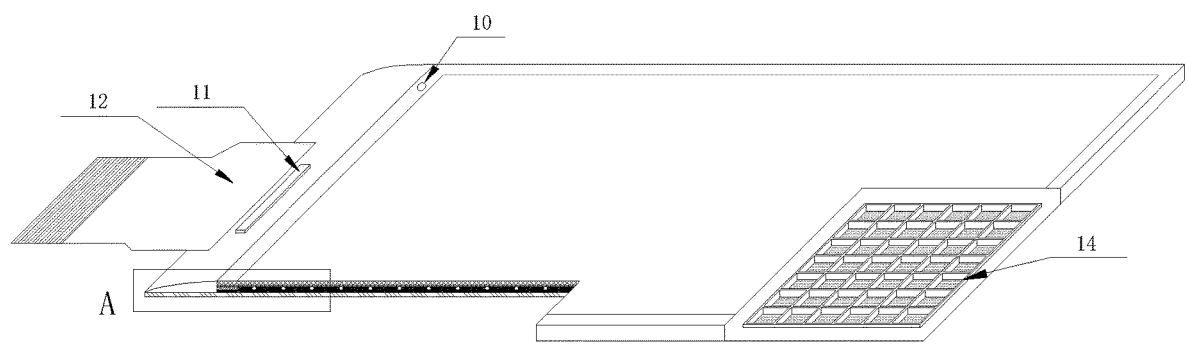
FIG. 1 is a side view showing the structure of the present invention.

The description of reference designators: 1: transparent electrode; 2: electrically conductive layer; 3: display plasma; 4: support microsphere; 5: lightproof insulating adhesive layer; 6: spacer frame; 7: TFT glass substrate; 8: display area protection layer; 9: RTV silicone; 10: conductive silver paste; 11: IC module; 12: flexible circuit board; 13: pixel electrode; 14: plasma barrier enclosure array; 15: gap.

DETAILED DESCRIPTION OF THE EMBODIMENTS

The present invention will be further described hereinafter with reference to the specific drawings and embodiments.

The present invention is not limited to the following embodiments, and the drawings referred to in the following description are intended to illustrate the contents of the present invention, namely, the present invention is not limited to the structure of the electronic ink display screen exemplified in the drawings.

Figure 2:
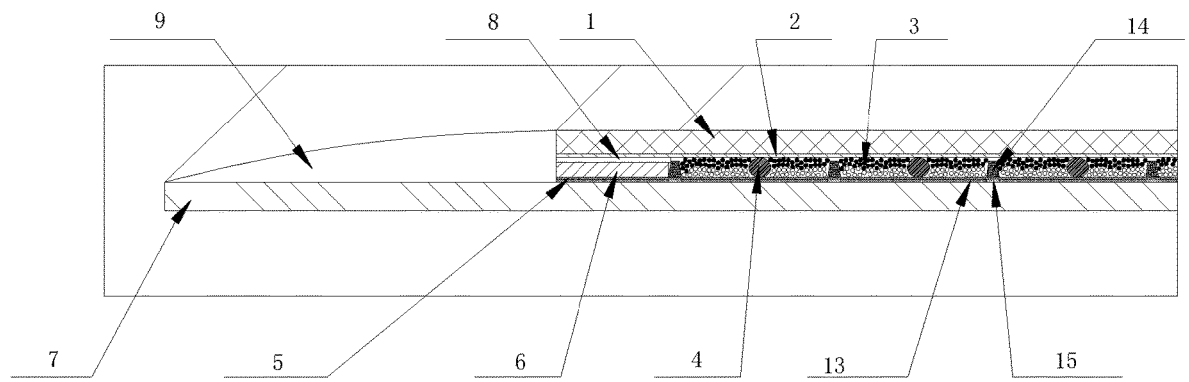
FIG. 2 is a cross-sectional view showing the structure of portion A in FIG. 1.

As shown in FIG. 1 and FIG. 2, in the present embodiment, a double-particle electronic ink display screen is taken as an example. A high-resolution display plasma module includes a pixel electrode 13 and a transparent electrode 1 located above the pixel electrode 13, characterized in that a display plasma 3 is provided between the pixel electrode 13 and the transparent electrode 1, and a spacer frame 6 is located around the display plasma 3. A plasma barrier enclosure array 14 for uniformly dispersing and stabilizing the display plasma 3 is provided on the pixel electrode 13. The plasma barrier enclosure array 14 includes a plurality of plasma barrier enclosures distributed in an array, and the pixel electrode 13 includes a plurality of pixel electrode units arranged in an array. The plasma barrier enclosure is located on the gap 15 between the pixel electrode units, and each plasma barrier enclosure contains only one pixel electrode unit. The width of the plasma barrier enclosure is equal to the width of the gap 15 between the pixel electrode units. Equivalently, a patterned structure of an enclosure is formed on the surface of the pixel electrode 13. With the patterned structure, each pixel electrode unit is surrounded by a plasma barrier enclosure, thereby obtaining a high-resolution display effect. The width of the plasma barrier enclosure is not more than 30 microns, preferably 5-15 microns, and the height of the plasma barrier enclosure is not more than 60 microns, preferably not more than 10 microns. The material of the plasma barrier enclosure is acrylic resin, polyurethane resin, epoxy resin, organic silicone resin, or glass, preferably acrylic resin, polyurethane resin and glass. There is a gap between the plasma barrier enclosure and the transparent electrode 1. The display plasma 3 can completely cover the transparent electrode 1 through the gap, thereby achieving 100% rate of the screen coverage, and completely eliminate the adverse effects of the wall material of the micro-cup and microcapsule structure on the display effect.

The display plasma 3 has a thickness of 2-70 microns, preferably 8-20 microns. The electrophoretic fluid in the display plasma 3 has a viscosity of 100-100000 cP, preferably 1000-10000 cP. The display plasma 3 includes a plurality of white particles and a plurality of black particles. The white particles and the black particles are driven by the IC module 11 under different electric fields. The pixel electrode 13 may include a segment code and a dot matrix etc. The electrophoretic particles can move through the gap between the plasma barrier enclosure and the transparent electrode 1, which makes the display screen display black and white colors, and improves the contrast and display effect of the display screen. The plasma barrier enclosure protects the display plasma 3 from moving freely on the horizontal surface, thereby ensuring the stability of the display plasma 3. The basic material of the pixel electrode 13 may be glass, and plastic etc. The plastic basic material includes Polyimide (PI), Polyethylene Naphthalate (PEN), and Polyethylene Terephthalate (PET) etc. The supporting microspheres 4 may be provided in the spacer frame 6 and the display plasma 3. The material of the supporting microspheres 4 includes resin microspheres and glass microspheres, and the material is selected according to the applications of the display module. The supporting microspheres 4 are pre-coated on the lightproof insulating adhesive layer 5 on the surface of the pixel electrode 13, and its material includes resin microspheres and glass microspheres. The supporting microsphere 4 has a diameter of 2-60 μm, preferably 5-30 microns.

The pixel electrode 13 is internally embedded in the TFT glass substrate 7. The pixel electrode 13 and the display plasma 3 are adhered to each other by a lightproof insulating adhesive layer 5. An electrically conductive layer 2 is provided between the display plasma 3 and the transparent electrode 1, and an electrically conductive layer 2 is also provided between the spacer frame 6 and the transparent electrode 1. The electrically conductive layer 2 may be Indium Tin Oxide (ITO), silver nanowires, graphene, or carbon nanotubes etc. The basic material of the transparent electrode 1 includes glass, plastic, and glass or plastic with a protection layer. The plastic basic material includes Polyimide (PI), Polyethylene Naphthalate (PEN), or Polyethylene Terephthalate (PET) etc. The protection layer is deposited onto the surface of the basic material by the evaporation deposition mode. The protection layer plays a role of waterproofing and ultraviolet proof. A display area protection layer 8 is provided between the spacer frame 6 and the electrically conductive layer 2, and a display area protection layer 8 is also provided between the edge of the display plasma 3 and the electrically conductive layer 2. The material of the display area protection layer 8 includes polyurethane, acrylic resin, epoxy resin or natural polymer. An IC module 11 and a flexible circuit board 12 are provided on one side of the spacer frame 6, and are attached to the pixel electrode 13 by an electrically conductive adhesive tape. The edges of the IC module 11, the flexible circuit board 12, and the electrically conductive adhesive tape are fixed and sealed on the pixel electrode 13 by an RTV silicone 9.

The material of the lightproof insulating adhesive layer 5 includes polyurethane, acrylic resin, epoxy resin, and natural polymer etc. The adhesive may be water type, solvent type, hot-melt type, or photo curing type. Preferably, the adhesive is water type or photo curing type. The adhesive is used to protect the pixel electrode 13 from optical irradiation, and improve the performance and the service life of the display screen. Moreover, the display plasma 3 and the pixel electrode 13 are isolated by the adhesive to prevent the display plasma 3 from damaging the pixel electrode 13.

A method for manufacturing the high-resolution display plasma module according to the above embodiment, characterized in that the method includes the following steps.

Step 1: a plasma barrier enclosure array 14 is pre-prepared on a pixel electrode 13. Supporting microspheres 4 may be pre-coated on a surface of the pixel electrode 13. Before coating the supporting microspheres 4, a lightproof insulating adhesive layer 5 may be or may not be pre-coated.

The plasma barrier enclosure array 14 is covered on the surface of the pixel electrode 13 by printing, coating, or adhesive dispensing, and then is cured by photo curing, heat curing or moisture curing. Or, the plasma barrier enclosure array 14 is configured by a physical property method or chemical property method.

Step 2: the pixel electrode 13 is embedded in a TFT glass substrate 7, and the TFT glass substrate 7 is placed on an adhesive dispensing platform.

Step 3: a frame sealing adhesive is dispensed on the pixel electrode 13 by an adhesive dispenser to form a spacer frame 6. The material of the frame sealing adhesive includes epoxy resin, acrylic resin, and polyurethane resin etc. The curing method of the frame sealing adhesive includes photo curing, heat curing, and moisture curing etc. Preferably, the curing method is the photo curing. The material of the frame sealing adhesive may include the supporting microspheres 4 or not. The spacer frame 6 has a width of 2-300 microns, preferably 50-200 microns, and the spacer frame 6 has a height of 5-150 microns, preferably 15-60 microns.

Step 4: the display plasma 3 is printed in the spacer frame 6 by the silk-screen printing equipment. The display plasma 3 can be applied on the surface of the pixel electrode 13 or the transparent electrode 1 by printing, coating, adhesive dispensing or the like. Preferably, the applying method includes silk-screen printing, intaglio printing, and slot die coating etc.

Step 5: an electrically conductive silver paste 10 is coated in the spacer frame 6. The electrically conductive silver paste 10 may also be replaced by conductive sliver beads or conductive golden beads.

Step 6: the electrically conductive layer 2, the transparent electrode 1 and the display area protection layer 8 are laminated onto the entire spacer frame 6, and a curing is performed. In this case, the electrically conductive silver paste 10 is electrically connected to the pixel electrode 13, and the electrically conductive silver paste 10 is electrically connected to the transparent electrode 1 through the electrically conductive layer 2.

Step 7: a part of the transparent electrode 1, the electrically conductive layer 2, and the display area protection layer 8 is trimmed off by a glass cutting machine to expose a predetermined position for binding the IC module 11 on the pixel electrode 13.

Step 8: the IC module 11 and the flexible circuit board 12 are attached on the edge of the pixel electrode 13 by an electrically conductive adhesive tape through the Chip on Glass (COG) process.

Step 9: the edges of the IC module 11, the flexible circuit board 12, and the electrically conductive adhesive tape are fixed and sealed on the pixel electrode 13 by the RTV silicone 9 by the RTV silicone printing process, to complete the manufacture of the electronic ink display screen.

The display plasma 3 of the present invention includes at least two kinds of electrophoretic particles having different optical properties. Preferably, the colors of the electrophoretic particles include white, black, red, green, blue and yellow etc., so as to realize a display of black and white, single color, double colors, multiple colors and true color etc. Meanwhile, the display plasma 3 may include a fluorescent material. The fluorescent material includes an inorganic fluorescent material and an organic fluorescent material. The inorganic fluorescent material includes a rare earth fluorescent material and metal sulfide etc. The organic fluorescent material includes a small molecule fluorescent material and a macromolecule fluorescent material etc.

The display plasma module of the present invention is directly provided with the display plasma 3 without using the traditional microstructure such as microcapsule or micro-cup. A plasma barrier enclosure array 14 is provided in the display plasma 3 between the transparent electrode 1 and the pixel electrode 13, so as to form a patterned structure of an enclosure. Each pixel electrode unit is surrounded by a plasma barrier enclosure, thereby obtaining a high-resolution display effect. Compared with the traditional microstructure electrophoretic display screen, the the black-and-white display resolution can reach more than 600 dpi, the full-color display resolution can reach more than 200 dpi, and a display of 4, 8, 16, 32, 64, and even higher grayscale can be achieved. Meanwhile, the plasma barrier enclosure is covered on the gap between the pixel electrode units, and the pixel electrode 13 is controlled by the source circuit and the gate circuit, thereby effectively preventing short circuit between adjacent pixel electrode units. Also, the interference between the electric fields generated by the pixel electrode units is avoided, and the display plasma particles are prevented from gathering on the source circuit and the gate circuit, thereby ensuring the directivity and verticality of the electric field between the pixel electrode 13 and the transparent electrode 1. The entire manufacturing process is simplified. The display structure is simple. The thickness of the display layer is uniform and controllable. The electrophoretic fluid in the display plasma 3 can move freely, and can be uniformly dispersed and stabilized by the plasma barrier enclosure array 14, so as to achieve better display effect of the whole display screen. The microstructure, such as the traditional microcapsule and micro-cup, is removed from the module structure of the present invention, which increase the production efficiency and yield, and improves the display performance and service life.

The present invention and embodiments thereof are described above. The above description is nonrestrictive. The structure shown in the drawings is merely one embodiment of the present invention, and the actual structure is not limited thereto. In short, a person of ordinary skill in the art inspired by the present invention can design structures, methods, and embodiments similar to the technical solution without creative efforts and departing from the inventive concept of the present invention. These structures, modes and embodiments should also be considered as falling within the scope of the present invention.

What is claimed is:

1. A display plasma module, comprising: a pixel electrode and a transparent electrode located above the pixel electrode, wherein a display plasma is provided between the pixel electrode and the transparent electrode, and a spacer frame is located around the display plasma; a plasma barrier enclosure array for uniformly dispersing and stabilizing the display plasma is provided on the pixel electrode, the plasma barrier enclosure array comprises a plurality of plasma barrier enclosures distributed in an array, the pixel electrode comprises a plurality of pixel electrode units distributed in an array, the plasma barrier enclosures are located on gaps between the pixel electrode units, and each plasma barrier enclosure contains only one pixel electrode unit; and wherein an electrically conductive layer is provided between the display plasma and the transparent electrode, and the electrically conductive layer is also provided between the spacer frame and the transparent electrode, and a display area protection layer is provided between the spacer frame and the electrically conductive layer, and the display area protection layer is also provided between an edge of the display plasma and the electrically conductive layer.

2. The display plasma module according to claim 1, wherein a width of each plasma barrier enclosure is equal to a width of each gap between the pixel electrode units; the width of each plasma barrier enclosure is not more than 30 microns; and a height of each plasma barrier enclosure is not more than 60 microns.

3. The display plasma module according to claim 1, wherein a material of the plasma barrier enclosure in the plasma barrier enclosure array is selected from a group of acrylic resin, polyurethane resin, epoxy resin, organic silicone resin or glass.

4. The display plasma module according to claim 1, wherein the pixel electrode is internally embedded in a Thin Film Transistor (TFT) glass substrate, and the pixel electrode and the display plasma are adhered to each other by a lightproof insulating adhesive layer.

5. The display plasma module according to claim 1, wherein the display plasma has a thickness of 2-70 microns; an electrophoretic fluid in the display plasma has a viscosity of 100-100000 cP; and the display plasma comprises at least two kinds of electrophoretic particles having different photoelectric properties.

6. The display plasma module according to claim 1, wherein the spacer frame and the display plasma further comprise supporting microspheres; a material of the supporting microspheres comprises resin microspheres and glass microspheres; and each supporting microsphere has a diameter of 2-60 microns.

\* \* \* \* \*